Nov. 19, 1940.  E. W. LITTLE  2,221,840

ATTACHMENT FOR BIRD CAGES

Filed Oct. 27, 1938

INVENTOR.

Patented Nov. 19, 1940

2,221,840

UNITED STATES PATENT OFFICE 2,221,840

ATTACHMENT FOR BIRD CAGES

Earl W. Little, Indianapolis, Ind.

Application October 27, 1938, Serial No. 237,186

4 Claims. (Cl. 119—17)

This invention relates to attachments for bird cages and the prime feature of the invention is the provision of a removable shield or guard adapted to be introduced within the interior of the cage and to protect the lower extremities of the wires forming the body portion of the cage as well as preventing any litter passing to the exterior of the cage.

A further feature of the invention is the provision of a shield that may be mounted on and carried by a conventional pan or tray that is removable from the cage, so that when the pan is introduced into or removed from the cage, the shield will travel therewith.

A further feature of the invention is the provision of a shield that may be readily removed from the pan for cleansing purposes.

A further feature of the invention is the provision of means for holding the shield in more or less fixed position within the cage.

A further feature of the invention is the provision of feed cups and perches which are mounted on the pan and are removable from the cage when the pan is removed the supporting means for the cups and perches cooperating with parts of the shield for holding said shield against lateral movement when positioned upon the pan.

A further feature of the invention is in so constructing the supporting means for the cups and perches that more or less resiliency will be imparted thereto and at the same time to provide a space for the introduction of a strip of paper or the like over the bottom of the pan and beneath the shield mounted thereon.

A further feature of the invention is the provision of combined baffles and guides for the shield as it is resting within the cage or being removed or entered thereinto.

Other objects and advantages will be hereinafter more fully set forth and pointed out.

In the accompanying drawing.

Figure 1:
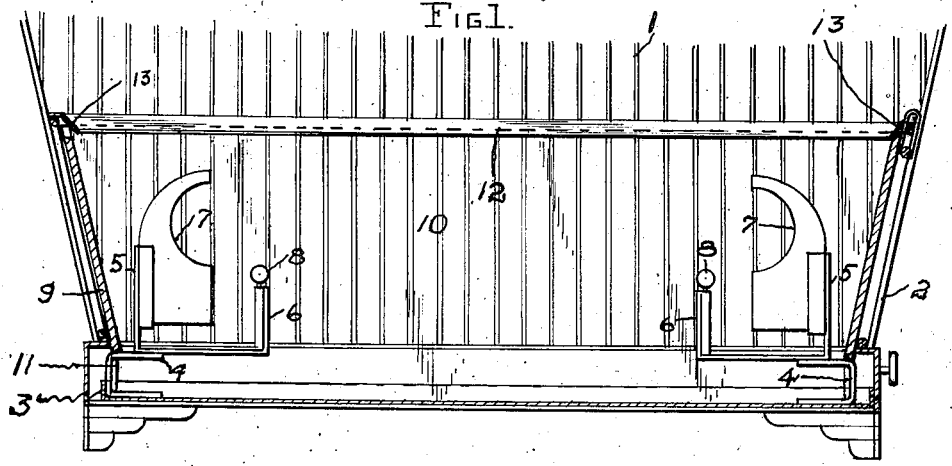
Figure 1 is a sectional view through the lower portion of a bird cage showing the invention mounted therein.
Figure 2:
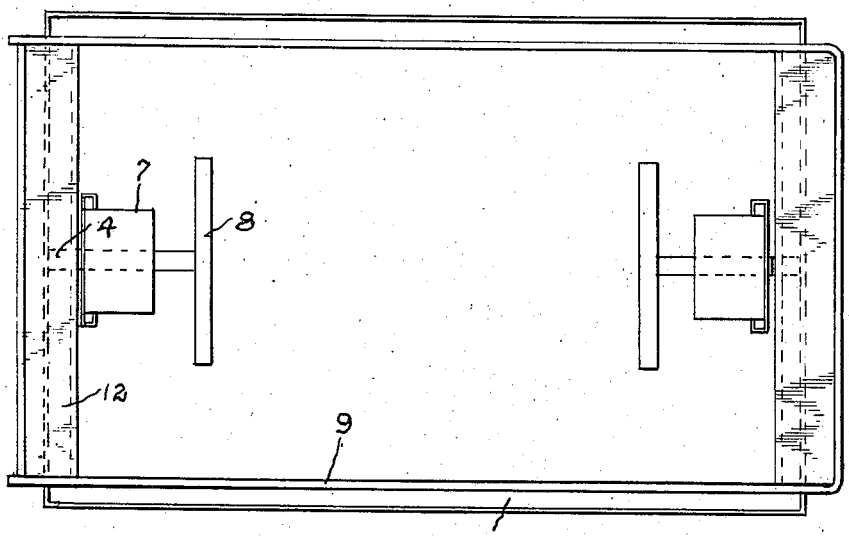
Figure 2 is a top plan view of the pan for the cage with the splash shield mounted thereon removed from the cage.

Referring to the drawing the numeral 1 designates the bottom portion of the cage, the body of which is formed of the conventional wires, said body portion having a hinged section 2 that is designed to be swung to open position for the introduction or removal of a pan or tray 3, said pan having sliding action with respect to the bottom portion of the cage.

The bottom of the pan 3 has secured thereto substantially clevis shaped brackets 4, extending upwardly from which are standards 5 and 6, on which are removably mounted feed cups 7 and perches 8 respectively, the shape of the brackets lending resiliency to the perches when a bird alights thereon.

It is customary to provide cages with splash shields, but heretofore they have been attached exteriorly of the cage and usually permanently thereto, rendering it difficult to cleanse the shield and the wires of the cage, as in this construction, the droppings etc., may come in direct contact with the wires of the cage covered by the shield.

To overcome these objectionable features, a shield or guard 9 is provided, which is adapted to pass entirely within the confines of the cage and project and cover the wires of the cage 1 for a distance above the pan or tray 3, the walls of the shield resting in close proximity to the wires of the cage when entered therein.

The shield or guard 9 may be constructed of any suitable material, but is preferably constructed of transparent plastic material 10 which is impervious to water or the like and preferably imperforate, said shield extending upwardly a distance above the pan 3 and thus protecting the wires forming the body of the cage as well as preventing particles escaping from the interior of the cage. The lower end sections are preferably provided with notches 11 which notches fit over the brackets 4 and prevent casual lateral movement of the shield with respect to the pan 3.

The shield 9 is guided into the cage and held in close proximity to the side walls of the cage by means of guards 12 which are fixed to the side walls of the cage and are inclined with their inner free edges projecting below the top edges of the side walls of the shield, thus not only forming a guard for the shield, but also preventing offal passing to the exterior of the shield.

One end wall is formed shorter than the remainder of the walls of the shield so that the shield may readily pass beneath guards 13 at the ends of the cage. If preferred the edges of the shield may be provided with a metal bead 14, which protects the free edges of the shield from being injured, although the material from which the shield is constructed is sufficiently rigid to be self supporting.

Figure 3:
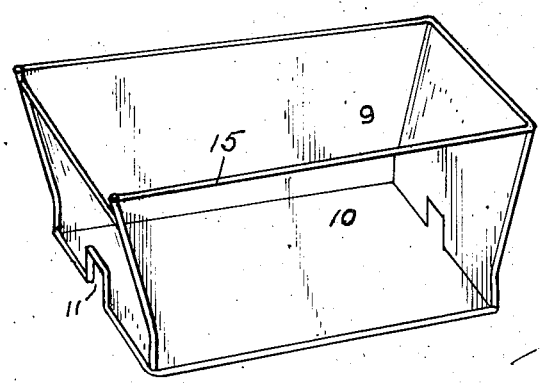
Figure 3 is a perspective view of a splash shield removed from the pan, showing the shield mounted on a supporting frame.
Figure 4:
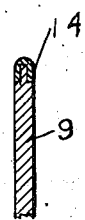
Figure 4 is a detail sectional view through one side wall of the shield showing a protecting bead thereon.

When a more fragile or pliable material is used instead of the more rigid plastic material, such as oiled silk, wire mesh or the like, a frame 15 is to be provided, as shown in Fig. 3 of the drawing, the frame being preferably formed of wire and shaped similar to the outlines of the shield 9.

By attaching the feed cups 7 and perches 8 to the pan 3 in an elevated position and removably mounting the shield 9 on the pan, any suitable covering, such as paper, may be placed in the bottom of the pan prior to placing the shield 9 in the pan.

When the pan is being introduced into or removed from the cage, the hinged section 2 is swung outwardly so that the pan 3, containing the feed cups, perches and shield mounted thereon, may be bodily removed or returned to the cage.

It will likewise be seen that by placing the shield within the cage and extending the shield to a considerable height above the pan, the wires of the cage will be protected from being contacted by the water from the bird bath or droppings within the cage and by making the shield removable, the wires may be readily cleaned and polished at the points covered by the shield.

Furthermore, by removably mounting the feed cups, perches and shield on the pan or tray, these parts may be more readily cleansed when removed from the cage.

What I claim is:

1. The combination with a bird cage having a removable pan, of a shield adapted to be mounted on said pan and enter said cage, and guards carried by said cage for preventing droppings from passing exteriorly of said shield and for guiding said shield and retaining the side walls thereof adjacent the walls of the cage.

2. The combination with a cage structure having a removable pan slidably mounted therein, of a shield forming structure adapted to be mounted in said pan and carried thereby and adapted to be entered into or removed from the cage with the pan, and means on the cage structure for guiding the shield when being introduced into or removed from the cage structure.

3. The combination with a removable pan for bird cages, and cup supporting members secured thereto, of a splash shield, said shield having notches adapted to engage parts of said cup supporting members and hold said shield against lateral movement.

4. The combination with a bird cage and a pan carried thereby, said cage and pan being substantially oblong, and a door at one end of the cage for the passage of said pan, of a shield removably mounted on said pan and conforming in shape to the interior outlines of said cage and with its lower edge supported by said pan and removable with the pan, said shield projecting a distance above said pan and adapted to rest in close proximity to the wall forming wires of the cage.

EARL W. LITTLE.